Oct. 14, 1941.    L. E. SODERQUIST    2,259,430
VULCANIZING PRESS
Filed Dec. 2, 1939    3 Sheets-Sheet 1

INVENTOR
LESLIE E. SODERQUIST
BY
ATTORNEYS

Oct. 14, 1941.  L. E. SODERQUIST  2,259,430
VULCANIZING PRESS
Filed Dec. 2, 1939     3 Sheets-Sheet 2
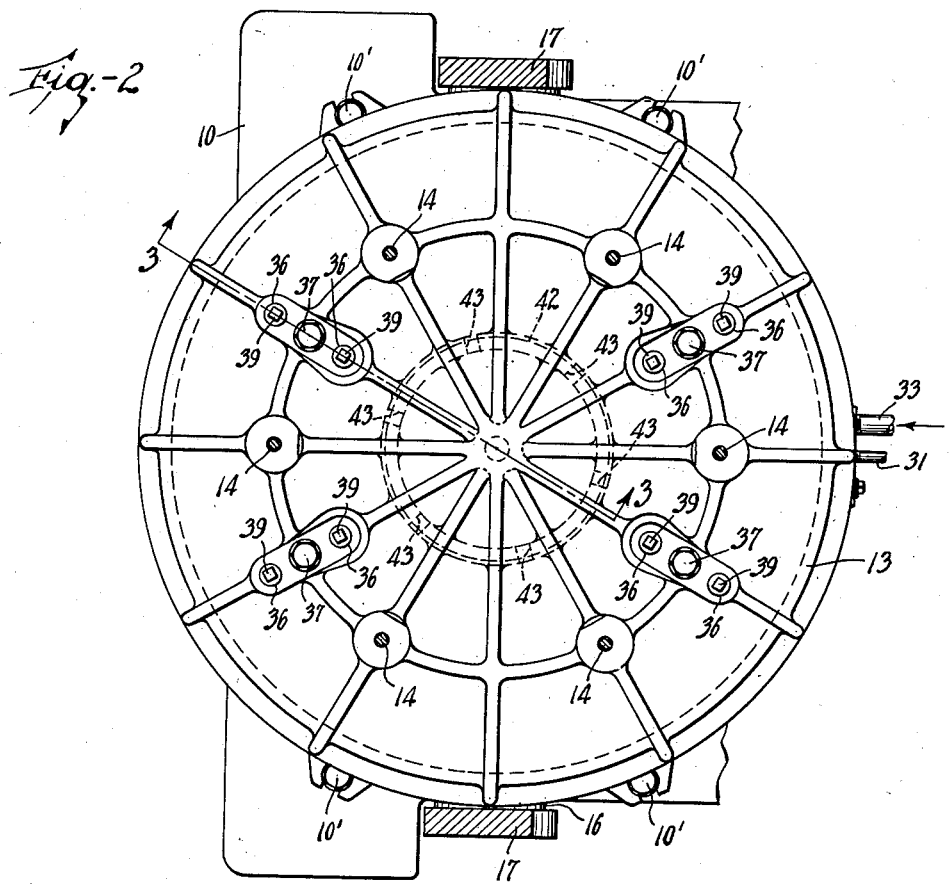
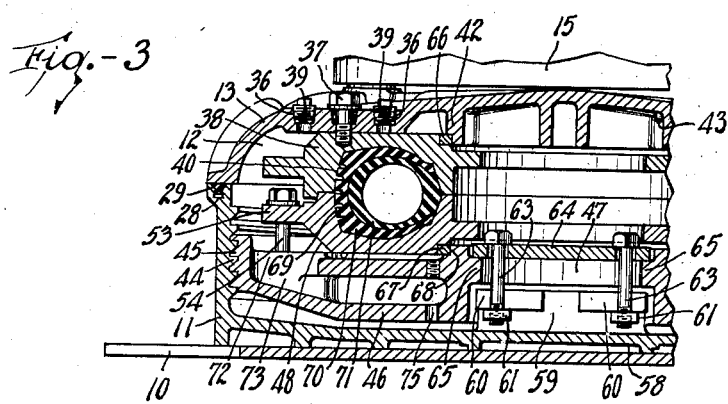
INVENTOR
LESLIE E. SODERQUIST
BY
ATTORNEYS

INVENTOR
LESLIE E. SODERQUIST

ATTORNEYS

Patented Oct. 14, 1941

2,259,430

UNITED STATES PATENT OFFICE 2,259,430

VULCANIZING PRESS

Leslie E. Soderquist, Akron, Ohio, assignor to The McNeil Machine & Engineering Company, Akron, Ohio, a corporation of Ohio Application December 2, 1939, Serial No. 307,266

6 Claims. (Cl. 18—17)

This invention relates to improvements in vulcanizing presses and more particularly to presses which are adapted for use in the vulcanization of pneumatic tires.

The press of this invention is of the individual type, that is to say, a tire is vulcanized between upper and lower heated mold sections, and an object of this invention is to provide a press of the individual type in which mold sections of various sizes may be readily used.

The individual type of press has, in many tire plants, supplanted the old style pot heater, and the mold sections previously used with the latter have been, prior to this invention, practically worthless. By means of the present invention, however, I am able to utilize these pot heater mold sections in individual presses, thus affording substantial savings in these tire plants.

Heretofore, individual tire presses have contained steam jacketed mold sections, one for the upper mold and one for the lower. It is another object of my invention to dispense with the use of steam jacketed mold sections by providing upper and lower shells which together form a curing chamber which receives a pair of detachably secured complementary mold sections which carry a tire to be vulcanized in the press.

A further object is to provide means to insure a proper fit of the mold sections in the curing chamber, said means being capable of regulation to permit mold sections of various sizes to be utilized in the curing chamber.

Additional objects are to provide novel means for securing the mold sections in the curing chamber and to provide for proper circulation of steam or other curing medium in the chamber so as to properly vulcanize the tire.

Other objects and advantages will become apparent from the following description taken in conjunction with the accompanying drawings.

In the drawings:

Fig. 2 is a section taken substantially on line 2—2 of Fig. 1;

Fig. 3 is a fragmentary section taken partly on line 3—3 of Fig. 2, and partly on line 3—3 of Fig. 4;

Figure 1:
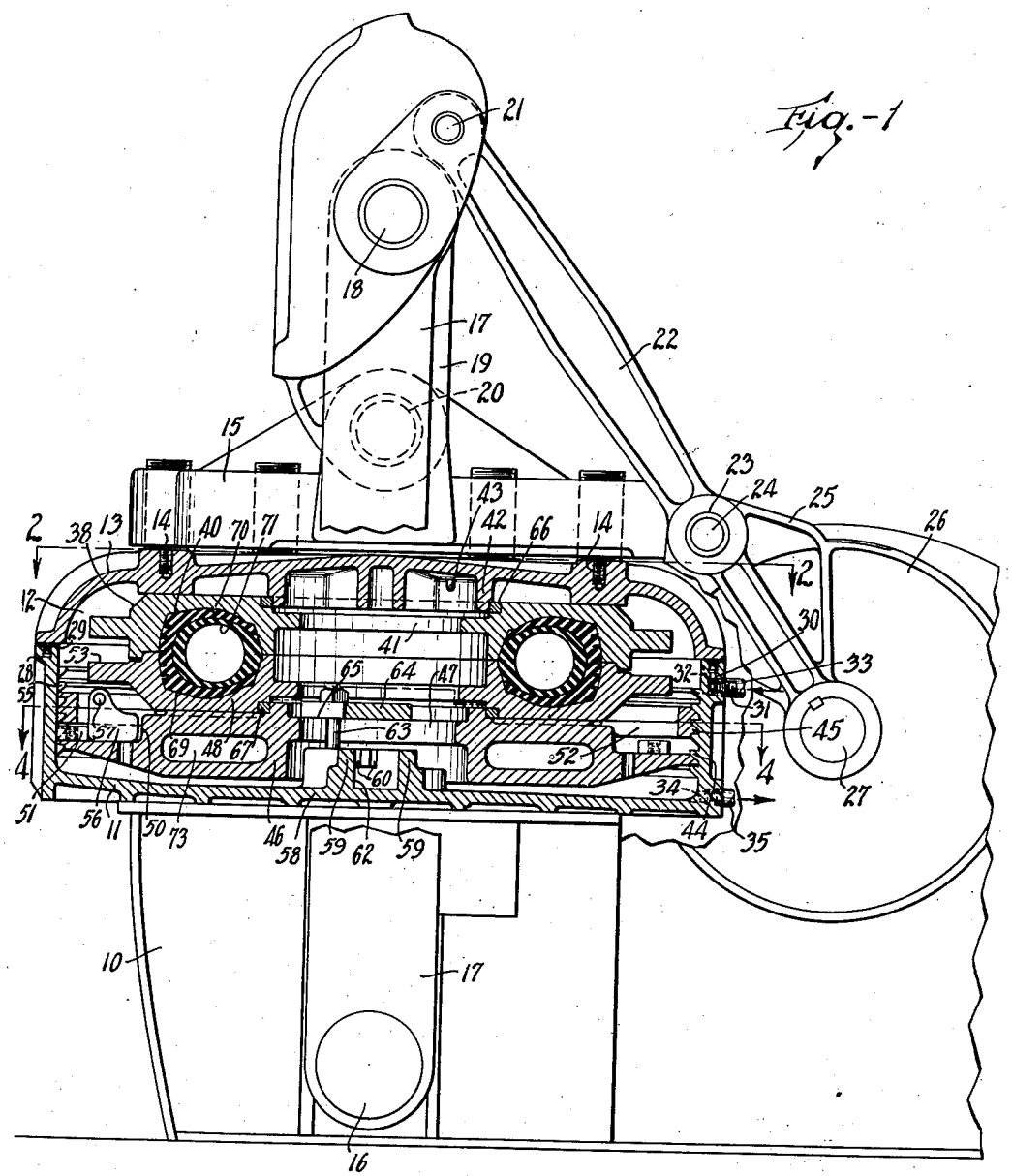
Fig. 1 is a side elevation of an individual vulcanizing press with parts broken away and shown in section.

Referring to the drawings the numeral 10 indicates the base of the press having permanently secured thereto as at 10' the lower annular shell member 11. Cooperating with member 11, to form a curing chamber 12, is a movable upper annular shell member 13, adjustably secured as at 14 to a movable platen 15.

Any suitable means may be used for moving the upper shell member toward and away from the lower shell. For this purpose, I have shown the mechanism used in my copending application Serial No. 199,417, filed April 1, 1938, which includes a stationary shaft 16 carried in base 10. Shaft 16 forms a fixed bearing for a pair of parallel links 17 which extend upwardly from opposite ends of shaft 16, beyond the platen 15, and are pivoted at their upper ends, by bearing pins 18, to a pair of rocking arms or levers 19, which extend on either side of the operating centers formed by the pins 18. At their lower ends the levers 19 are connected by the transverse shaft 20 on which the platen 15 is pivoted. Adjacent the upper ends of the rocking arms 19 are located the pivot pins 21 by which the arms 19 are connected to a pair of parallel operating links 22, the lower ends of which are pivoted on bushings 23 surrounding pins 24 secured to plates 25 which are, in turn, fixed upon the sides of large gears 26 mounted for rotation with shaft 27. Shaft 27 is rotated by means of driven pinions (not shown) which mesh with gears 26, and by means of the links and arms described, the upper shell member 13 is moved into and out of position with respect to the lower shell member. For further details of the opening and closing mechanism of the press, reference should be had to my said copending application.

In bringing the shell members together to form the curing chamber 12 it is necessary that a tight joint be formed between them to prevent the escape of steam or other curing medium which might be used. I provide a tight joint by forming a tapered groove 28 in the upper surface of the lower shell member 11, which groove is partially filled with a gasket 29 of rubber or other suitable material. At one point (Fig. 1) the bottom of groove 28 communicates with one end of a passage 30 in the lower shell member, the opposite end of which communicates with an inlet pipe 31 adapted to be connected to a source of compressed air (not shown). Thus, when the shell members are closed, compressed air is utilized to force the gasket 29 into contact with the upper shell member to provide a tight joint between the members. Obviously any other suitable means may also be used to obtain a tight joint.

Adjacent its upper end, the lower shell member is also provided with an inlet opening 32 (Fig. 1) which receives an inlet pipe 33 adapted to communicate with a source (not shown) of a curing medium such as steam or hot water, while the lower end of the lower shell member is provided with an outlet opening 34 which receives an outlet pipe 35 adapted to receive a drain pipe or the like (not shown), as will be understood.

As clearly shown in Figs. 2 and 3, the upper shell member is provided with a plurality of spaced threaded openings 36. In the present embodiment there are four groups each having three openings 36 arranged in radial alignment with the center of the shell member, but obviously, this number and arrangement may be varied as desired. The central opening 36 of each group of three is, in this embodiment, shown with a bolt 37 extending therethrough and into threaded engagement with an upper mold section 38, thus providing a four point engagement of the upper shell member with the upper mold section 38 to securely hold the latter to the shell member and to permit opening and closing movement of the upper shell and upper mold member as a unit.

By arranging a plurality of the openings 36 in radial alignment at four spaced points, I am enabled to select any one or more of the openings to receive the bolts 37 for securing the shell member to the upper mold section. As clearly shown in Fig. 3, this arrangement will allow either a larger or a smaller mold section 38 to be secured to the shell. If a larger mold section is used, the outermost opening 36 of each group can be used to receive bolts 37, while if a smaller mold section is used, the innermost opening 36 of each group will be used. Hence, it will be apparent that upper mold sections of various sizes may be interchangeably used with the upper shell member, it only being necessary to insure proper alignment between the selected openings 36 and the threaded openings in the mold sections.

These upper mold sections 38 may constitute new equipment, but they may also be old upper mold sections which have previously been used in pot heaters. Obviously, to utilize an old pot heater mold section it is only necessary to place threaded openings in the upper surface at points which will insure proper alignment with the selected openings 36, whereby such mold section can be readily secured to bolts 37. The openings 36 which do not receive bolts 37 may be filled with a suitable threaded plug 39 to prevent escape of the curing medium through these openings.

The upper mold section 38 is, of course, provided with the usual tire cavity 40 containing any desired tread design, and the central opening 41 which allows free passage of the curing medium through the center of the mold section. It will also be noted that the upper shell member 13 is provided with an annular strengthening and centering rib 42 provided with a plurality of passageways or openings 43 that insure passage of the curing medium downwardly through the central opening in mold section 38.

The inner side wall of the lower shell member 11 is threaded as at 44 to receive the threaded outer periphery 45 of a filler or spacer ring 46 having a central opening 47. This spacer ring 46 is threaded downwardly into the lower shell member when the shell members are separated and may be placed at any desired height in the lower shell member so as to support the lower mold section 48 and insure proper relation and cooperation between the mold sections 38 and 48 when the press is closed.

Figure 4:
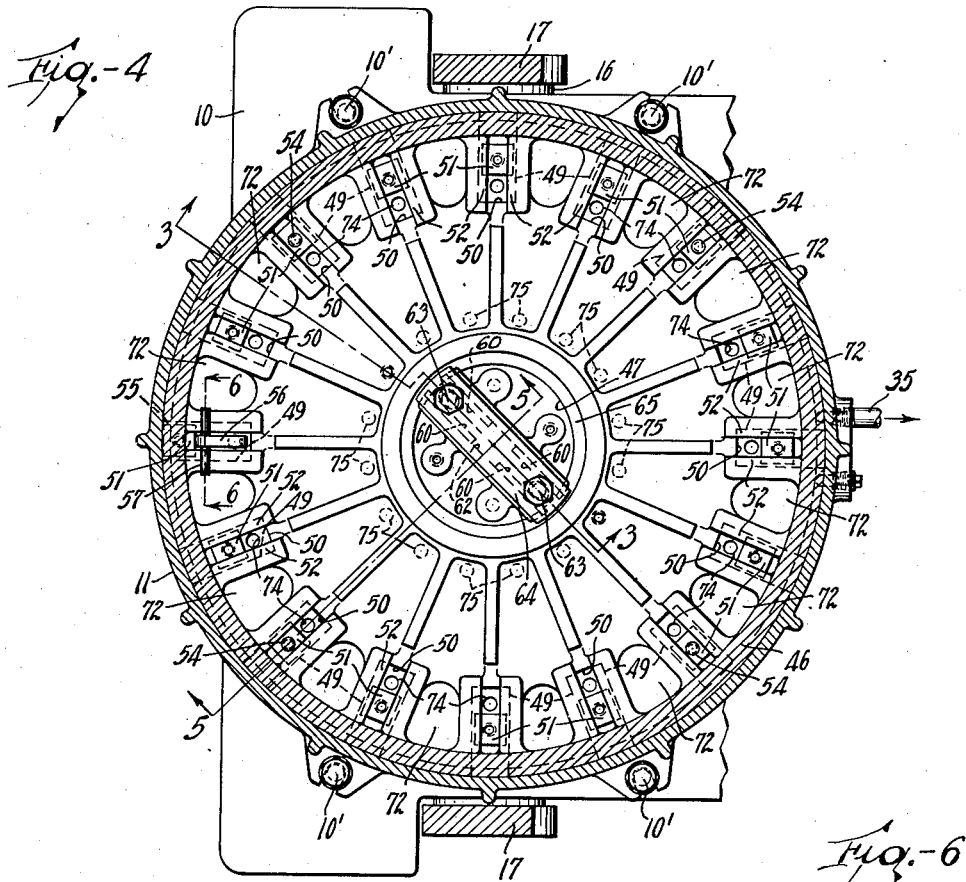
Fig. 4 is a section taken substantially on line 4—4 of Fig. 1.
Figure 5:
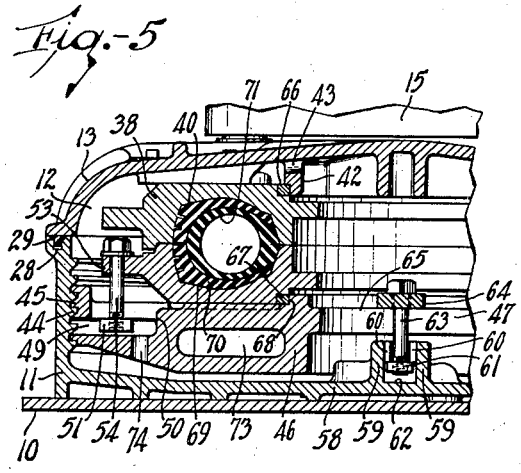
Fig. 5 is a fragmentary section taken substantially on line 5—5 of Fig. 4.

As more clearly shown in Figs. 4 and 5, spacer ring 46 is provided with a plurality of spaced radial grooves 49 which extend from the outer periphery of the ring to shoulder portions 50, and each groove 49 carries a nut 51 movable longitudinally for the entire length of said groove, said nuts 51 being maintained in said grooves by lateral flanges 52 which extend over each side of the grooves.

At a plurality of spaced points (in this instance four), the flange 53 of the lower mold section 48 has an opening which receives a bolt 54, the lower end of which is adapted to be threaded into one of the nuts 51 to secure mold section 48 to ring 46. Since there are four bolts 54 in this embodiment, the ring and mold section 48 will be secured at four spaced points, although any other suitable arrangement may also be used.

It so happens that the size of the mold section 48 shown in the drawings permits the bolts 54 to engage nuts 51 at points about midway of the grooves 49, but it will be obvious that graduated sizes of lower mold sections, either larger or smaller, could also be accommodated by virtue of the grooves 49 which permit movement of the nuts 51. Hence, it will be seen that my press will accommodate graduated sizes of mold sections, both upper and lower.

The relationship between the upper and lower mold sections 38 and 48 is usually determined when the mold sections are initially designed, i. e., the points at which the tread designs, etc., in the two sections meet is determined in advance, so that it is necessary to insure that this relationship will be maintained when the two sections are secured in the curing chamber. We have already seen that the upper mold section 38 is correctly secured to the upper shell member and cannot move relative to the upper shell member after the bolts 37 have been properly tightened. Hence, the problem is to get the lower mold section 48 properly aligned with the upper mold section with respect to tread designs, etc., and for this purpose we make use of the threaded ring 46, together with the large number of grooves 49 and nuts 51. To secure the proper relationship and alignment of the lower mold section with the upper, I turn the ring 46 until the proper height for the lower mold section is obtained, and then the bolts 54, being fixed with respect to the lower mold section, are secured to whichever nuts 51 appear under these bolts, or close thereto. If the nuts 51 do not exactly align with the bolts 54, a very slight turning of the ring will secure proper alignment without materially affecting the proper height for the ring and lower mold section.

Figure 6:
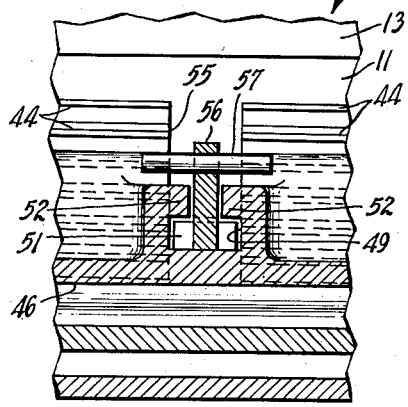
Fig. 6 is an enlarged fragmentary view taken on line 6—6 of Fig. 4.

Having secured the proper alignment and relationship of the mold sections it is now desirable to lock the ring 46 against accidental turning movement. This is accomplished by forming a keyway 55 (Figs. 1, 4 and 6) in one portion of the threads 44 in the lower shell member 11, and when this keyway becomes aligned with any of the grooves 49, the nut 51 in such groove can be pushed into the keyway to serve as a key and to lock ring 46 against further turning movement with respect to the shell member 11. To maintain the locked relation between the ring and the lower shell member, a removable dog 56 is dropped into the groove 49 between the nut 51 and shoulder 50, as clearly shown in Figs. 1 and 4. To permit ready manual manipulation of the dog 56, a pin 57 is extended therethrough to serve as a handle.

I also find it desirable to lock the ring 46 to the bottom of the lower shell member 11 and to this end the bottom wall 58 of the latter is provided with two pair of spaced ribs 59 (Figs. 4 and 5) having lateral flanges 60 which hold a pair of nuts 61 in grooves 62 as is more clearly shown in Figs. 3 and 5. These nuts 61 receive a pair of bolts 63 which extend through a bridging member 64 arranged across the central opening 47 in ring 46, being supported on the upper surface of an annular ledge or flange 65. When bolts 63 are tightened the ring 46 will be firmly secured to the bottom wall of the lower shell member.

In order to facilitate proper centering of the mold sections in the shell members, upper mold section 38 may be provided with a ring 66 of hardened material which engages against rib 42 on the upper shell member, while lower mold section 48 may be provided with a similar ring 67 which engages against an annular shoulder 68 formed on ring 46.

The lower mold section 48 is provided with the usual cavity 69 having tread designs therein which match up with similar designs in cavity 40 of the upper mold section, the two cavities 40 and 69 being adapted to receive the pneumatic tire 70 in the customary manner. Tire 70 has a conventional airbag 71 therein which receives a curing medium in the usual manner. While I have not shown any valve connections leading to the airbag 71, such connections are well known in the art, and are omitted because they form no part of the present invention.

It will be noted that ring 46 is provided with ample cut-out portions and openings to insure proper passage of the curing medium through the ring into contact with the tire mold sections. For example cut-outs 72 (Fig. 4) are provided on the upper surface of the ring, while passages 73 (Figs. 3 and 5) are provided through the ring. Likewise, openings 74 (Figs. 1, 4 and 5) are arranged between the bottom of grooves 49 and the bottom of ring 46 while openings 75 are provided between opening 73 and the bottom of ring 46. Also, the central opening 47 in ring 46 is aligned with the similar openings in the mold sections 38 and 48.

It will be apparent that the lower mold section 48 may also be formed from new material or it may comprise an old pot heater mold section. In any event, my press is well adapted to use old pot heater mold sections with but very few minor alterations required.

After the mold sections 38 and 48 have been properly aligned and secured to the shell members, the press may be opened and closed in the same manner as any other individual press. After closing, with the curing chamber properly sealed, with a tire in the mold sections to be vulcanized, a curing medium such as steam or hot water is admitted through inlet 33, at the same time a similar fluid is admitted to the airbag 71. After the time determined for a proper cure has elapsed, the curing medium may be drained off through outlet 35, the press opened and the tire removed.

While I have shown my invention for use in an individual press in which one mold section is movable, it will be obvious that the invention may also be used in presses which require movement of both mold sections. Also, the invention may be readily adapted in multiple presses, such as dual or twin presses.

Although I have shown and described the preferred form of my invention it will be apperent that changes may be made therein without departing from the spirit of the invention or from the scope of the subjoined claims.

What is claimed is:

1. A vulcanizing press of the character described comprising a pair of relatively movable shell members cooperating to form a curing chamber, a mold section carried in one of said shell members, a complementary mold section carried in the other shell member, and means for spacing said mold members in said shell members comprising a spacing ring threaded in one of said shell members and supporting one of said mold sections, said spacing ring lying wholly within said curing chamber between said last named mold section and the wall of its corresponding shell member.

2. A vulcanizing press of the character described comprising a pair of relatively movable shell members cooperating to form a curing chamber, a mold section carried in one of said shell members, a complementary mold section carried in the other shell member, means for spacing said mold members in said shell members comprising a spacing ring threaded in one of said shell members and supporting one of said mold sections, said spacing ring lying wholly within said curing chamber, and means for locking said ring to the mold section supported by it.

3. A vulcanizing press of the character described comprising a pair of relatively movable shell members cooperating to form a curing chamber, a mold section carried in one of said shell members, a complementary mold section carried in the other shell member, means for spacing said mold members in said shell members comprising a spacing ring threaded in one of said shell members and supporting one of said mold sections, said spacing ring lying wholly within said curing chamber, means for locking said ring to the mold section supported by it, and means for locking said ring to one of said shell members.

4. In a vulcanizing press, upper and lower relatively movable shell members cooperating to form a curing chamber, means on said upper shell member for securing therein upper mold sections of graduated sizes, an upper mold section secured to said means, means carried by said lower shell member for securing therein lower mold sections of graduated sizes, a lower mold section complementary to said upper mold section secured to said last named means, said last-named means comprising a spacing ring threaded in the lower shell member and supporting the lower mold section, and means for locking said ring to said lower mold section.

5. In a vulcanizing press, upper and lower relatively movable shell members cooperating to form a curing chamber, an upper mold section secured in said upper shell member, means carried by said lower shell member for securing therein lower mold sections of graduated sizes, and a lower mold section complementary to said upper mold section secured to said means, said means comprising a spacing ring threaded in the lower shell member and supporting the lower mold section, and lying wholly between said lower mold section and the bottom wall of said lower shell member.

6. In a vulcanizing press, upper and lower relatively movable shell members cooperating to form a curing chamber, means on said upper shell member for securing therein upper mold sections of graduated sizes, an upper mold section secured to said means, means carried by said lower shell member for securing therein lower mold sections of graduated sizes, a lower mold section complementary to said upper mold section secured to said last named means, said last named means comprising a spacing ring threaded in the lower shell member and supporting the lower mold section, and means for locking said ring to said lower shell member.

LESLIE E. SODERQUIST.